US009258993B2

(12) United States Patent
Szechenyi et al.

(10) Patent No.: US 9,258,993 B2
(45) Date of Patent: Feb. 16, 2016

(54) MOTION DECOY WITH BIAXIAL WING BEAT

(71) Applicants: Keith Dominick Szechenyi, Stanwood, WA (US); Dominick Martin Szechenyi, Stanwood, WA (US)

(72) Inventors: Keith Dominick Szechenyi, Stanwood, WA (US); Dominick Martin Szechenyi, Stanwood, WA (US)

(73) Assignee: Evolution Decoys LLC, Pleasant Hill, CA (US)

( * ) Notice: Subject to any disclaimer, the term of this patent is extended or adjusted under 35 U.S.C. 154(b) by 255 days.

(21) Appl. No.: 13/797,113

(22) Filed: Mar. 12, 2013

(65) Prior Publication Data

US 2013/0239454 A1 Sep. 19, 2013

Related U.S. Application Data

(60) Provisional application No. 61/610,373, filed on Mar. 13, 2012.

(51) Int. Cl.
*A01M 31/06* (2006.01)

(52) U.S. Cl.
CPC .................... *A01M 31/06* (2013.01)

(58) Field of Classification Search
CPC ....... A01M 31/06; B64C 33/00; B64C 33/02; B64C 33/025
USPC .................. 43/3, 2; 244/22; 446/35
See application file for complete search history.

(56) References Cited

U.S. PATENT DOCUMENTS

| 1,031,807 | A | * | 7/1912 | Molnar | B64C 33/02 244/72 |
| 1,797,347 | A | * | 3/1931 | Jordanoglou | B64C 33/02 244/22 |
| 1,940,490 | A | * | 12/1933 | Frazier | 40/417 |
| 2,017,534 | A | * | 10/1935 | Spencer | 244/22 |
| 2,480,390 | A | * | 8/1949 | Thompson | 43/3 |
| 2,849,823 | A | * | 9/1958 | Miller | 43/3 |
| 3,220,253 | A | * | 11/1965 | Parker | 446/199 |
| 3,537,205 | A | * | 11/1970 | Robert | A01M 31/06 43/3 |
| 4,128,958 | A | * | 12/1978 | Snow | 43/3 |

(Continued)

FOREIGN PATENT DOCUMENTS

| EP | 1179296 A2 * | 2/2002 | ............ A01M 31/06 |
| EP | 1279333 A2 * | 1/2003 | ............ A01M 31/06 |

(Continued)

OTHER PUBLICATIONS

Edge by Expedite Rapid Flyer Lucky Duck Drake Combo, www.edgebyexpedite.com/store/rapid-flyer-lucky-duck-drake-combo-endorsed-by-duck-commander.html, Admitted Prior Art.

(Continued)

*Primary Examiner* — Darren W Ark
(74) *Attorney, Agent, or Firm* — Quarles & Brady LLP

(57) ABSTRACT

A motion decoy having a body and wings in the form of a waterfowl provides a realistic biaxial wing beat motion. The wing beat motion simultaneously includes a flapping action and a rotation action. The flapping action can sweep through an obtuse angle, while at the same time the rotating action that changes the angle of incidence of the wings at different angular positions. The compound biaxial wing beat motion better replicates the motion of live waterfowl, especially during the "lighting" phase of flight.

14 Claims, 15 Drawing Sheets

(56) References Cited

U.S. PATENT DOCUMENTS

| | | | |
|---|---|---|---|
| 4,712,749 A * | 12/1987 | Fox | B64C 33/02 |
| | | | 244/22 |
| 4,845,873 A * | 7/1989 | Hazlett | A01M 31/06 |
| | | | 43/3 |
| 4,896,448 A * | 1/1990 | Jackson | 43/3 |
| 5,960,577 A * | 10/1999 | Walterson | 43/3 |
| 6,170,188 B1 * | 1/2001 | Mathews | 43/3 |
| 6,227,483 B1 * | 5/2001 | Therriault | 244/22 |
| 6,360,474 B1 * | 3/2002 | Wurlitzer | 43/3 |
| 6,574,903 B2 * | 6/2003 | Solomon | 43/3 |
| 6,698,132 B1 * | 3/2004 | Brint | 43/3 |
| 6,840,477 B2 * | 1/2005 | Hamamoto et al. | 244/22 |
| 7,225,579 B2 * | 6/2007 | Haley | 43/3 |
| 7,350,745 B2 * | 4/2008 | Livingston | 244/22 |
| 7,651,051 B2 * | 1/2010 | Agrawal et al. | 244/22 |
| 7,937,881 B2 * | 5/2011 | Price | 43/3 |
| 8,151,512 B2 * | 4/2012 | Latschaw | 43/3 |
| 2004/0195436 A1 * | 10/2004 | Sinclair | 244/49 |
| 2005/0138855 A1 * | 6/2005 | Jensen | 43/3 |
| 2007/0210207 A1 * | 9/2007 | Liao | 244/22 |
| 2011/0088307 A1 * | 4/2011 | Rice | 43/3 |
| 2011/0203154 A1 * | 8/2011 | Price | 43/3 |
| 2012/0255214 A1 * | 10/2012 | Krocheski et al. | 43/3 |

FOREIGN PATENT DOCUMENTS

| | | | | |
|---|---|---|---|---|
| GB | 2295953 A * | 6/1996 | | A01M 31/06 |
| WO | WO 03059058 A1 * | 7/2003 | | A01M 31/06 |

OTHER PUBLICATIONS

Mojo Mallard (With Multi-Cycle Remote Kit) (Drake), www.mojooutdoors.com/index.php/vendor-products-menu-item/product/304-mojo-mallard-with-multi-cycle-remote-kit-drake/category_pathway-38, Admitted Prior Art.

* cited by examiner

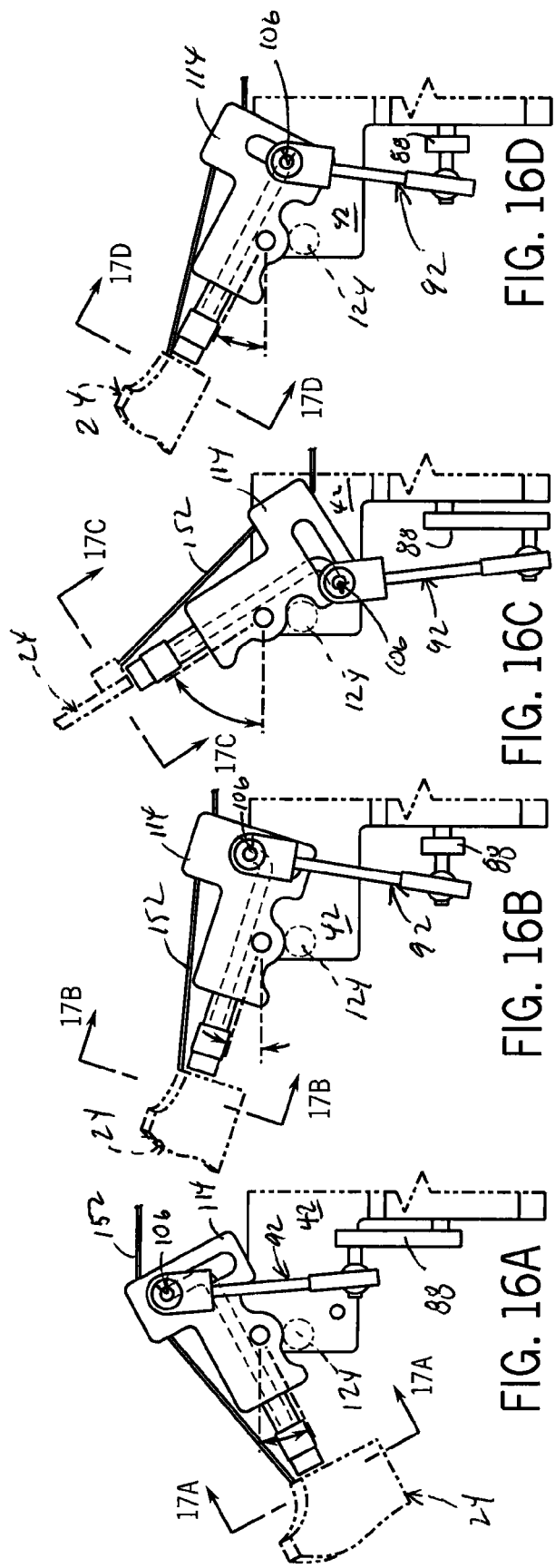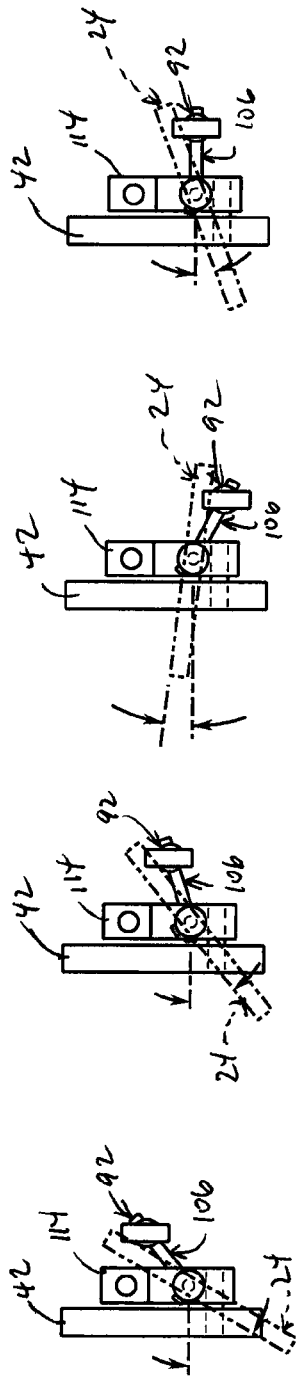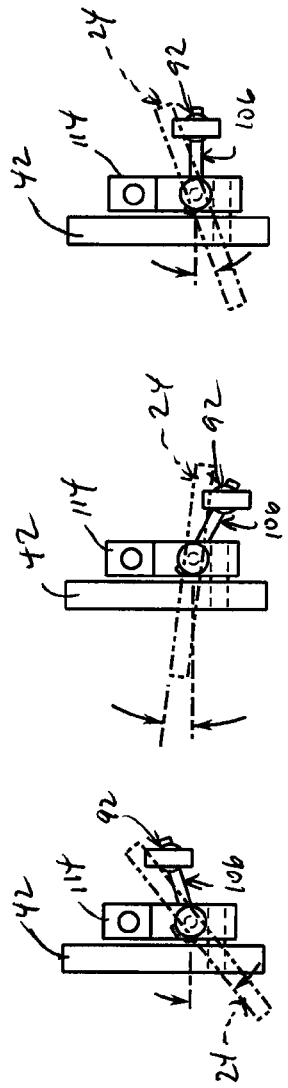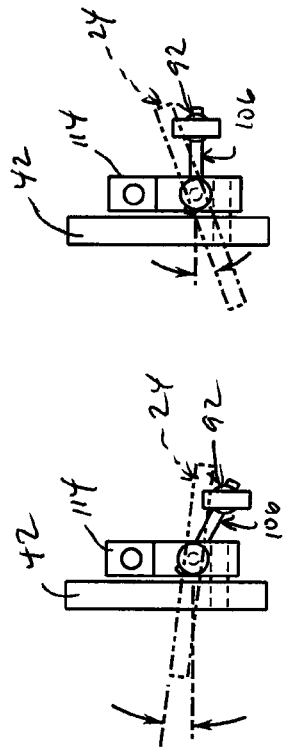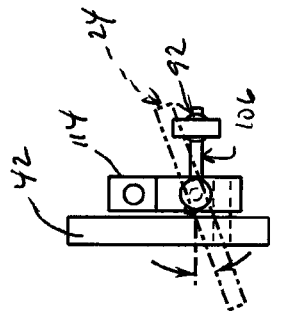

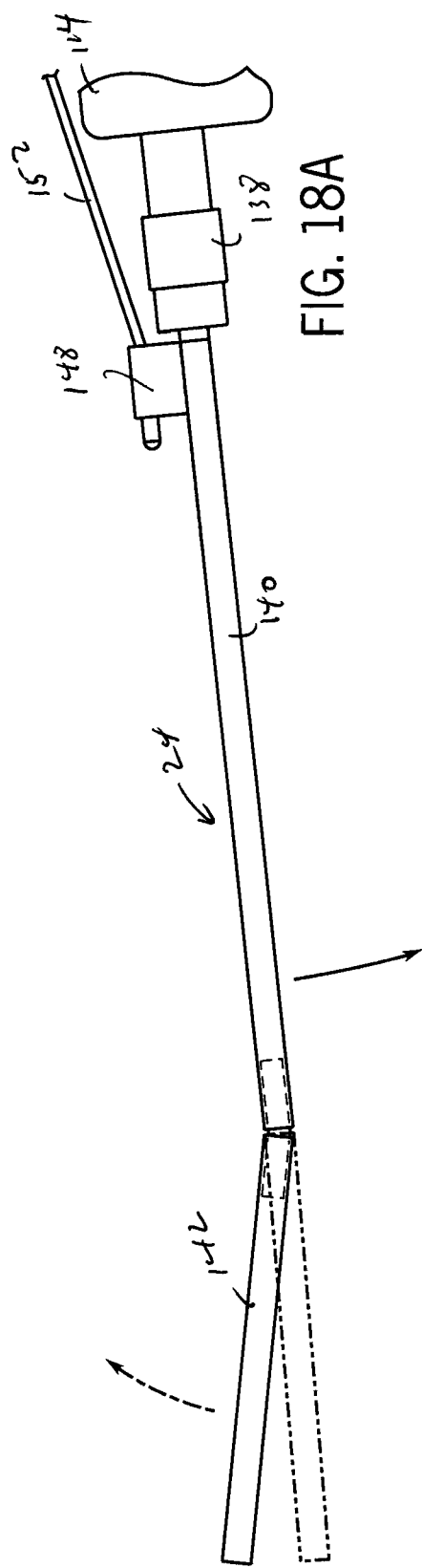
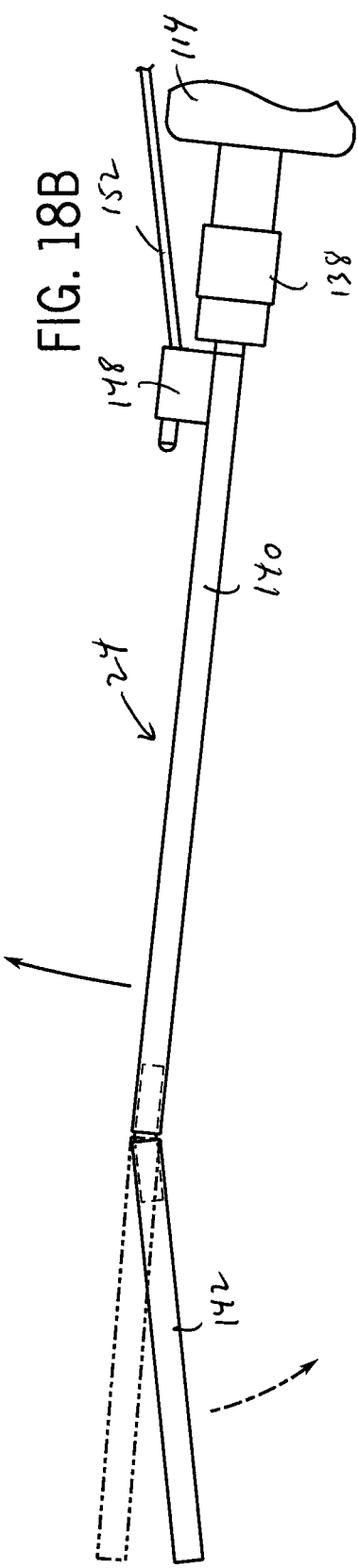
FIG. 18A
FIG. 18B

MOTION DECOY WITH BIAXIAL WING BEAT

CROSS-REFERENCE TO RELATED APPLICATION(S)

This application claims priority to U.S. Provisional Application No. 61/610,373, filed Mar. 13, 2012.

STATEMENT OF FEDERALLY SPONSORED RESEARCH OR DEVELOPMENT

Not applicable.

FIELD OF THE DISCLOSURE

This disclosure relates to gaming decoys, and in particular to waterfowl decoys having simulated wing motion.

BACKGROUND OF THE DISCLOSURE

Decoys are well known and used by waterfowlers to lure live birds within shooting range. Traditionally, such decoys were carved of wood or cork. Now it is commonplace to mold the decoy body from plastic. The decoys can by static with no moving parts, either in full body with legs or with a keel, which can be weighted to maintain an upright position when on water. Static decoys are suited for replicating waterfowl at rest or floating on water. Motion decoys, on the to the other hand, are intended to replicate a bird in flight and provide a more realistic representation of the bird.

One common type of motion decoy is a spinner type decoy. Spinner decoys have wings that revolve about a single axis with respect to the decoy body. The wings are typically made from fabric or thin plastic material, such as PVC, and are coupled to a battery powered motor within the body of the decoy. The wings can be coupled directly to the shafts of two motors or a single double-ended motors. The wings could also be coupled to the motor by a belt and pulley arrangement. The wings are generally unrealistic with plain coloring, usually of contrasting colors on each to create a flash of color (such as white) as the wings revolve. However, some spinner decoys have wings with decals or printing that resembles feathers. Some are even flocked with fibers or other materials to provide greater realism.

Another common type of motion decoy is a flapper type decoy. Flapper decoys can have similar wing structures as spinner decoys, but they differ in that rather than simply revolving the wings, they are driven to impart an angular motion to the wings. One common way to achieve such angular movement is by connecting the inner ends of the wings to the decoy body, such as by hinges, and then rotatably coupling the wings to bent drive shafts. As the drive shafts rotate with respect to the wings, they pull and push on the wings to move the up and down about their hinges. Such angular movement creates a flapping motion that is better suited to replicate a bird in flight than the static decoys.

One problem with existing motion decoys is that the angular motion imparted to the wings does not present a realistic wing beat motion. For one thing, due to the bent shaft mechanism used to move the wings in the typical flapper decoy, the wings sweep through only an acute angle that is significantly less than that of live waterfowl. Also, due to the hinged connection of the wings the typical flapper decoy pivots each wing about a single axis albeit at an angle to the motor shaft axis unlike in spinner decoys. The existing motion decoys thus lack the realism of the compound movements that occur during the wing beat of live waterfowl. Moreover, simply replicating a flight motion as the prior motion decoys do does not present the live waterfowl with a naturally inviting environment, as does a lighting motion indicative of landing. As a result, existing motion decoys have become counterproductive in that their lack of realism has effectively become a marker for astute waterfowl to avoid.

This disclosure addresses these problems.

SUMMARY OF THE DISCLOSURE

A motion decoy having a body and wings in the form of a waterfowl provides a realistic biaxial wing beat motion. The wing beat motion simultaneously includes a flapping action and a rotation action. The flapping action can sweep through an obtuse angle, while at the same time the rotating action that changes the angle of incidence of the wings at different angular positions. The compound biaxial wing beat motion better replicates the motion of live waterfowl, especially during the "lighting" phase of flight.

The motion decoy can provide a more realistic wing beat not only by providing a rotating wing movement throughout the flapping action, but also by providing an angular range of motion that is reflective of a live waterfowl. For example, each wing can be made to pivot through an angle greater than 90 degrees, such as about 130 degrees. Each wing can also be made to rotate through a rotation angle of greater than 45 degrees, such as about 90 degrees. Such angular ranges of motion present a much more realistic appearing motion decoy when compared to the state of the art.

By way of example, the biaxial wing beat motion can be effected by an actuator that includes one or more electric motors, which can be powered by an onboard battery pack. If a single motor is used, a double ended shaft can be used to drive two linkage assemblies substantially in unison. Each linkage assembly can include a crank arm connected to the drive shaft that provides a pivot post at a free end which revolves about the drive axis. Each linkage assembly can also include two parts at angle to one another, or a single angle member having two legs, one which extends along the wing rotation axis and the other which is at angle. A coupler member can connect the crank arm to the angle member, and thus the drive shat to the wings. The opposite ends of the coupler can connect to the crank arm pivot post and the off axis leg of the angle member. The coupler thus compensates for the off axis location and motion of the angle member and crank arm and transfers the rotational movement of the crank arm about the drive axis to the wing.

For each wing, there can be a swivel joint that is coupled to the decoy body on a pivotal mount. The swivel joint can provide the pivot connection and be formed with an open-ended bore through which is disposed the leg of the angle member that extends along the rotation axis. The swivel joint can also include opening through one face that intersects the bore and the rotation axis through which the off axis leg of the angle member extends. In this way, during motion of the wings, the angle member can move inside of the swivel joint. Specifically, the axial part of the angle member will rotate above the rotation axis to rotate the wings and as it rotates the off axis part pivots within the facial opening until it contacts the swivel joint to cause it to pivot. Stop members can be disposed within the facial opening to dampen contact and provide the desired range of motion.

In addition, proper range of motion and wing beat characteristics can be aided by the use of a counterbalance arrangement, such as a stretch cord coupled to the wings that resists one or both of the amount of flap angle or wing rotation during at least a portion of a wing beat. Further, travel limiters can be provided which cam against a profiled edge of the swivel joints which rides along the travel limiter as the swivel joint pivots about the pivot axis. Interaction of the profiled edge and the travel limiter member can positively limit travel in at the ends of either or both of the down stroke and the upstroke.

Thus, in one aspect this disclosure provides: a waterfowl motion decoy, having a hollow body shaped in the form of a waterfowl; at least one wing member shaped in the form of a waterfowl wing; an actuator mounted within the body having a drive shaft rotatable about a drive axis; a swivel joint pivotally coupled to the body so as to pivot about a pivot axis disposed at an angle to the drive axis; and a linkage assembly coupled to the drive shaft and the wing member; wherein rotation of the drive shaft about the drive axis simultaneously causes the linkage assembly to pivot the swivel joint about the pivot axis and rotate the wing member about a rotation axis that pivots about the pivot axis along with the swivel joint.

In another aspect this disclosure provides: a waterfowl motion decoy, having: a hollow body shaped in the form of a waterfowl; a pair of wing members shaped in the form of waterfowl wings; an actuator mounted within the body having a drive shaft rotatable about a drive axis; a pair of swivel joints pivotally coupled to the body so as to pivot about parallel pivot axes disposed at an angle to the drive axis; and a pair of linkage assemblies each coupled to the drive shaft and one of the wing members; wherein rotation of the drive shaft about the drive axis simultaneously causes the linkage assemblies to pivot the swivel joints about the corresponding pivot axis and rotate the wing members about rotation axes that pivot about the corresponding pivot axis along with the associated swivel joint.

In yet another aspect this disclosure provides: an actuation mechanism for a motion decoy having a hollow body and at least one wing shaped in the form of a waterfowl, the mechanism including: an actuator mountable within the body having a drive shaft rotatable about a drive axis; a swivel joint pivotally mountable to the body so as to pivot about a pivot axis disposed at an angle to the drive axis; and a linkage assembly connectable to the wing member. The linkage mechanism can include: a crank arm connected to the drive shaft and providing a pivot post at a free end which revolves about the drive axis; an angle member having a first leg and a second leg, the first leg extending along and rotatable about a rotation axis that pivots about the pivot axis along with the swivel joint, the second leg extending at an angle to the rotation axis; and a coupler having a first opening at a first end that extends about the pivot post and a second opening at a second end that extends about the second leg of the angle member, wherein the first and second openings of the coupler lie in planes at an angle to one another. The rotation of the drive shaft about the drive axis can simultaneously cause the linkage assembly to pivot the swivel joint about the pivot axis and rotate the angle member about the rotation axis.

Still other features of the motion decoy will be apparent from the following description and accompanying drawings.

BRIEF DESCRIPTION OF THE DRAWINGS

FIGS. 16A-16D are a series of simplified partial rear views illustrating the left wing and linkage assembly at the angular positions corresponding to FIGS. 15A-15D;

FIGS. 17A-17D are a series of simplified partial views taken from the perspective of line 17-17 in FIGS. 15A-15D illustrating the left wing and linkage assembly at the respective angular positions; and FIGS. 18A-18B show the disjointed position of the wing tip at two positions of the wing beat motion.

DETAILED DESCRIPTION

Figure 1:
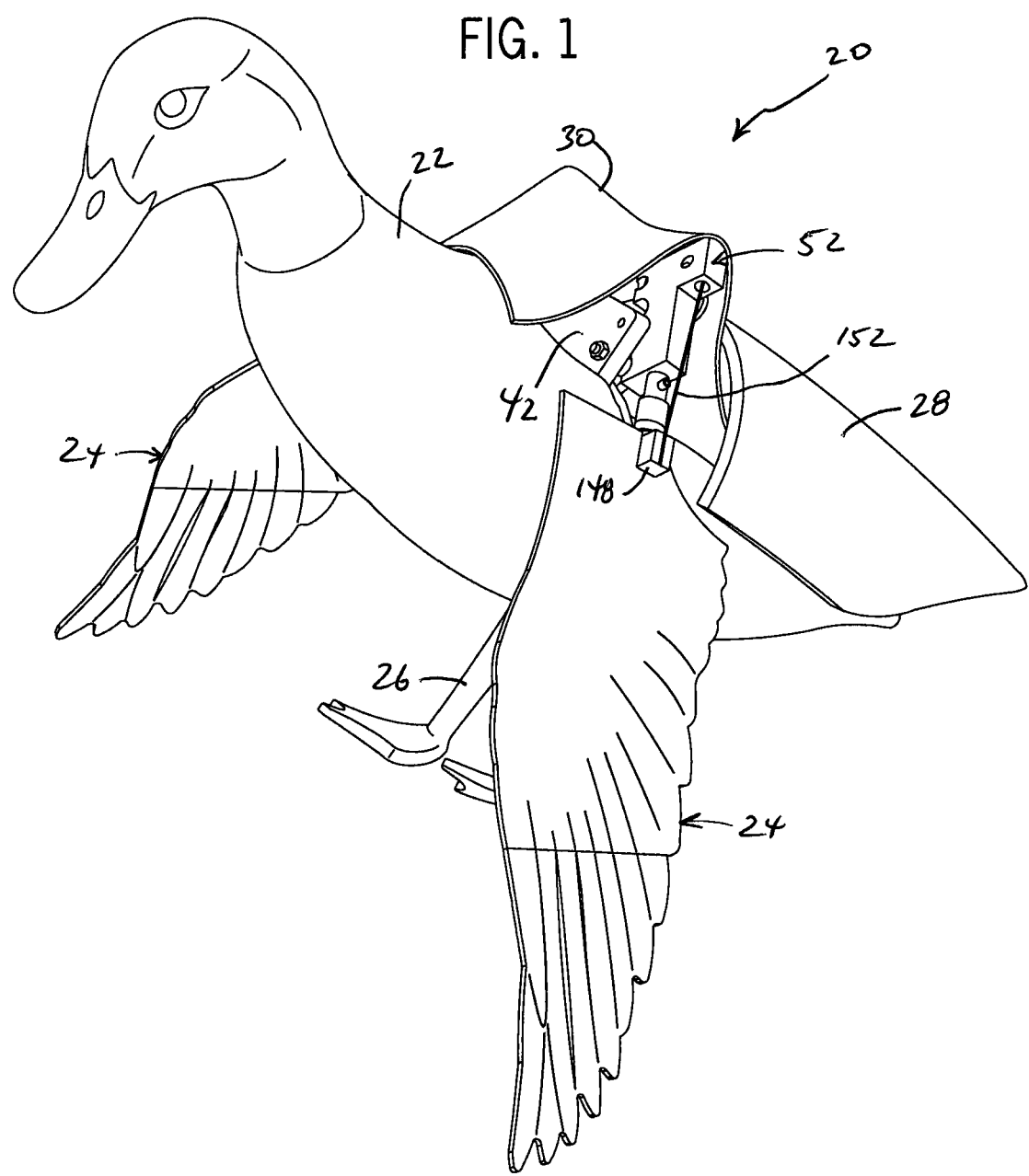
FIG. 1 is a front perspective view of an example waterfowl decoy in the form of duck according to this disclosure.

The following describes one or more example constructions of a motion decoy 20, as shown in the accompanying figures of the drawings described briefly above. Various modifications to the example constructions may be contemplated by one of skill in the art. For example, the motion decoy 20 is shown in the drawings as having a body 22, wings 24 and legs 26 that are in the general form of a duck. These features can be formed to resemble a specific type or breed of duck, both in configuration and in the surface ornamentation or augmentation applied to these features, including decals, printing or flocking. Furthermore, the motion decoy 20 is not limited to ducks. While some modifications may be necessary to the mechanisms and components described to accommodate for size and weight differences of various waterfowl, the principles and mechanisms disclosed herein can be incorporated into a motion decoy for any type of the over 60 species in the waterfowl group, including any type or breed of goose, swan, teal, loon and merganser. Thus, the following description of the example motion decoy 20 should not limit the applications contemplated by the inventors.

Figure 2:
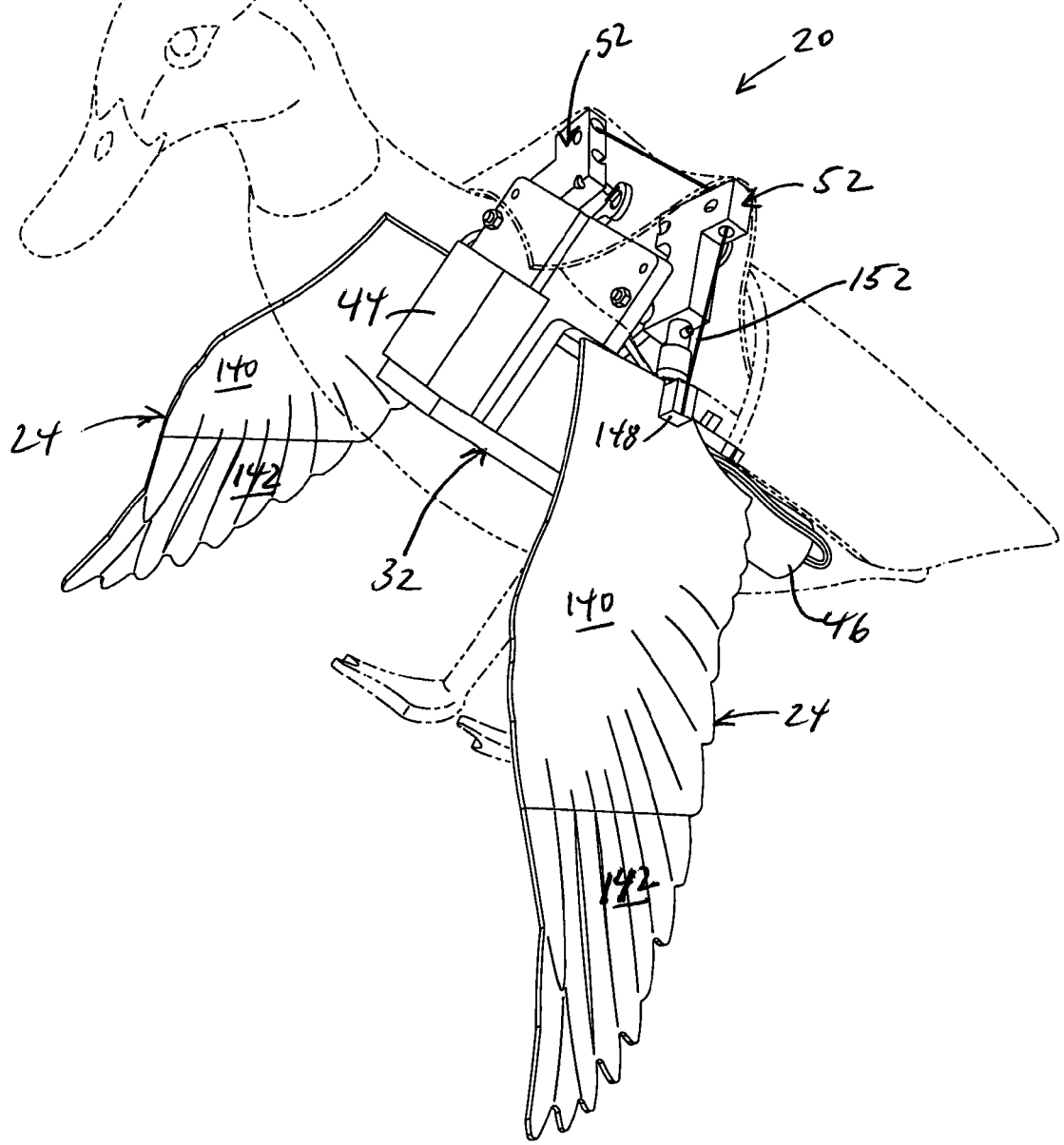
FIG. 2 is another front perspective view thereof with the decoy body shown in phantom.
Figure 3:
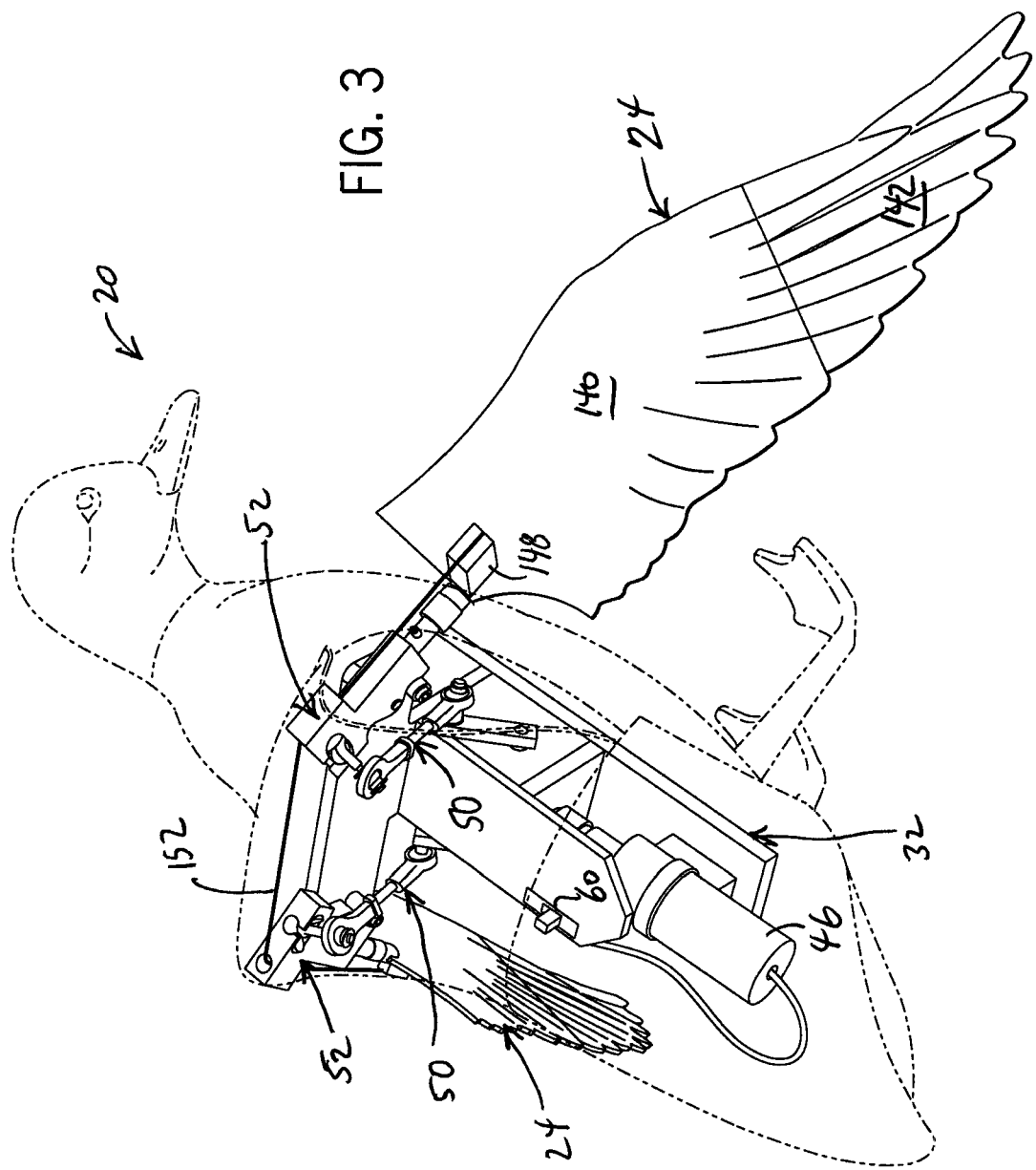
FIG. 3 is a rear perspective view thereof.
Figure 4:
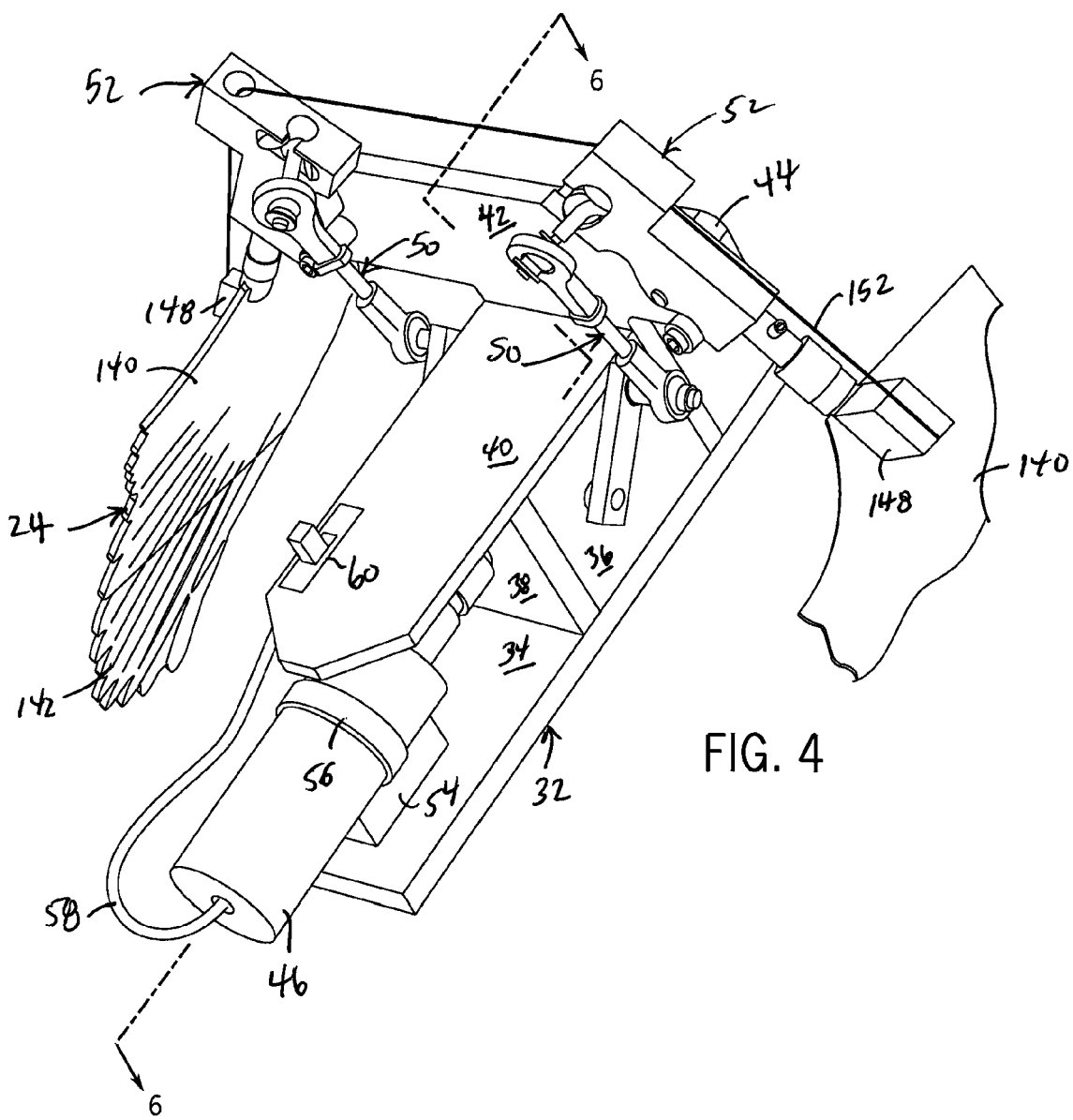
FIG. 4 is an enlarged rear perspective view thereof with the decoy body removed.
Figure 5:
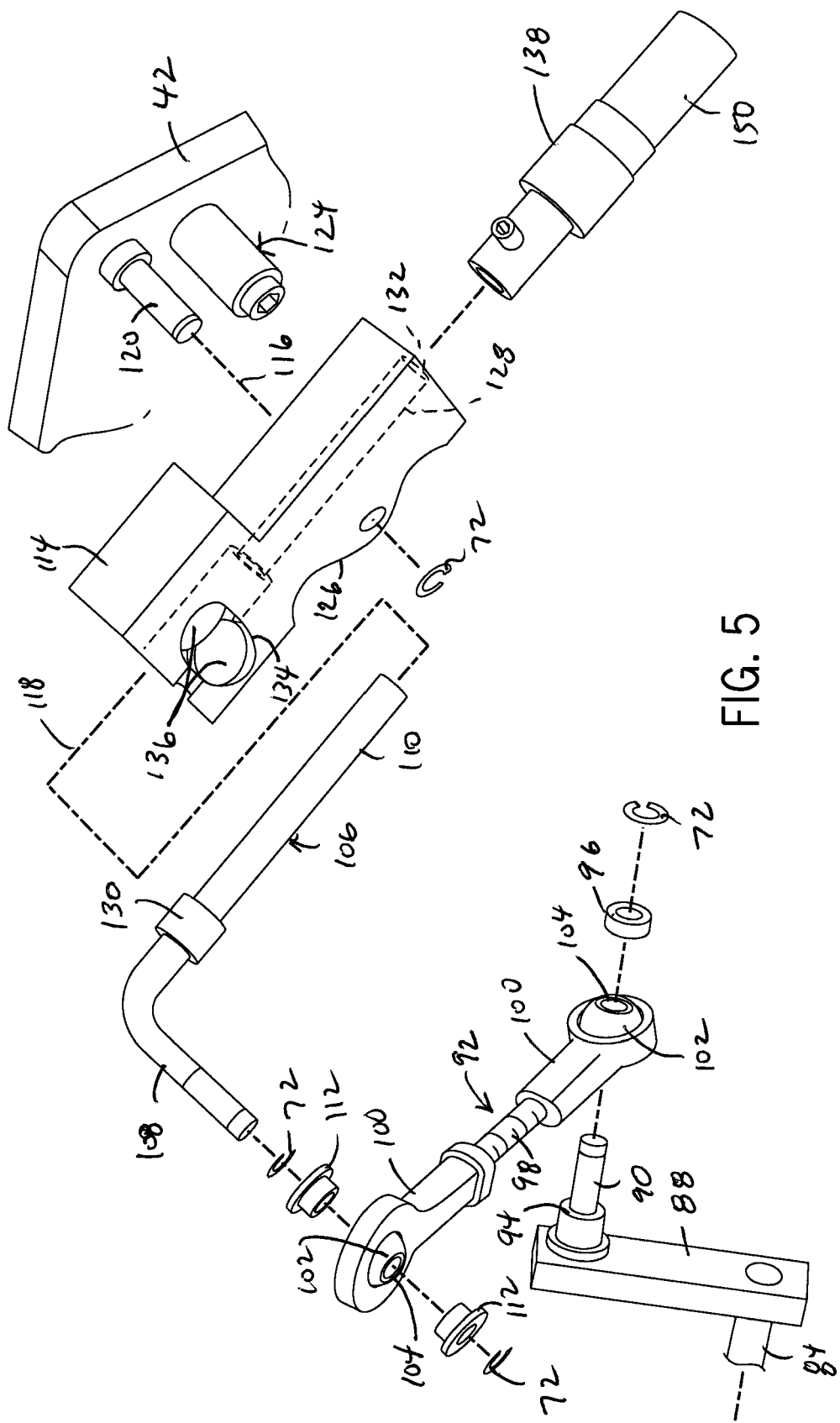
FIG. 5 is a rear assembly view of a linkage assembly for the right wing of the example decoy.
Figure 6:
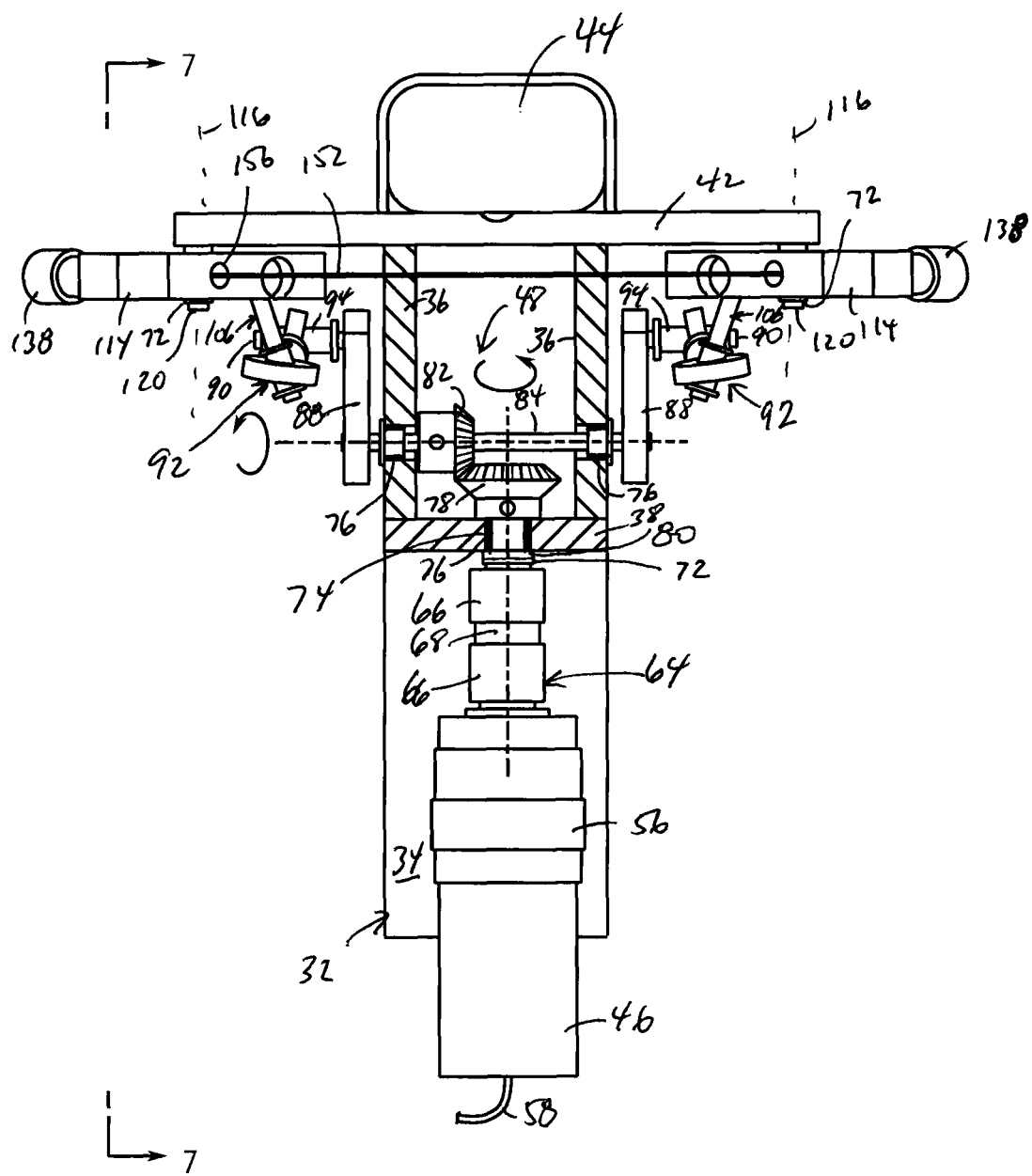
FIG. 6 is a sectional view taken along line 6-6 of FIG. 4 showing the drive and linkage assemblies of the example decoy.

FIGS. 1-3 show an example motion decoy 20 having a body 22, left and right wings 24 and removable legs 26 configured and marked to resemble a duck. The decoy body 22 can have a removable back panel 28 and a flexible cover flap 30 to conceal and allow for movement of the working parts of the motion decoy 20, as will be described. The body 22, back panel 28 and legs 26 can be plastic parts made using any suitable known molding technique. The cover flap 30 can be any flexible covering, such as synthetic or natural fiber fabric material, and can be connected along one edge to the back panel 28 and unattached at a free edge to allow the user to fold back the cover flap 30 to access the working parts of the motion decoy 20. The wings 24 will be described in greater detail below. However, generally the left and right wings are the same, except for being mounted as mirror images of each other, and can be made of a light-weight construction of any suitable pulp based or synthetic material with an outer skin to which printing, decals or flocking can be applied, and can have a solid or hollow core.

As shown in FIGS. 2 and 3, the decoy body 22 can be hollow, and its interior space suited to accommodate a mounting base 32 to which the working mechanisms of the motion decoy 20 attach. The mounting base 32 can provide a platform 34 that can be attached directly to the interior of the decoy body 22 via any suitable connection, such as adhesive or threaded fasteners (not shown). The platform 34 can support a gear box enclosure formed of two side walls 36, an end wall 38, a cover 40 and an upright wall 42. The upright wall 42 can have a T-shape with the cross-member of the "T" extending beyond the cover 40 and side walls 36. The cover 40 can extend from the upright wall 42 across the top of the side 36 and end 38 walls beyond the end wall 38 to overhang the platform 34. The mounting base 32 can be as shown in the example of FIGS. 2 and 3, or it can be of any other different suitable configuration to fix the position of the working components with respect to the decoy body 22. The mounting base 32 can be made of any suitable material, including sections of a polycarbonate thermoplastic material, such as Lexan®, which can be adhered or fastened together using any suitable connection technique.

Figure 7:
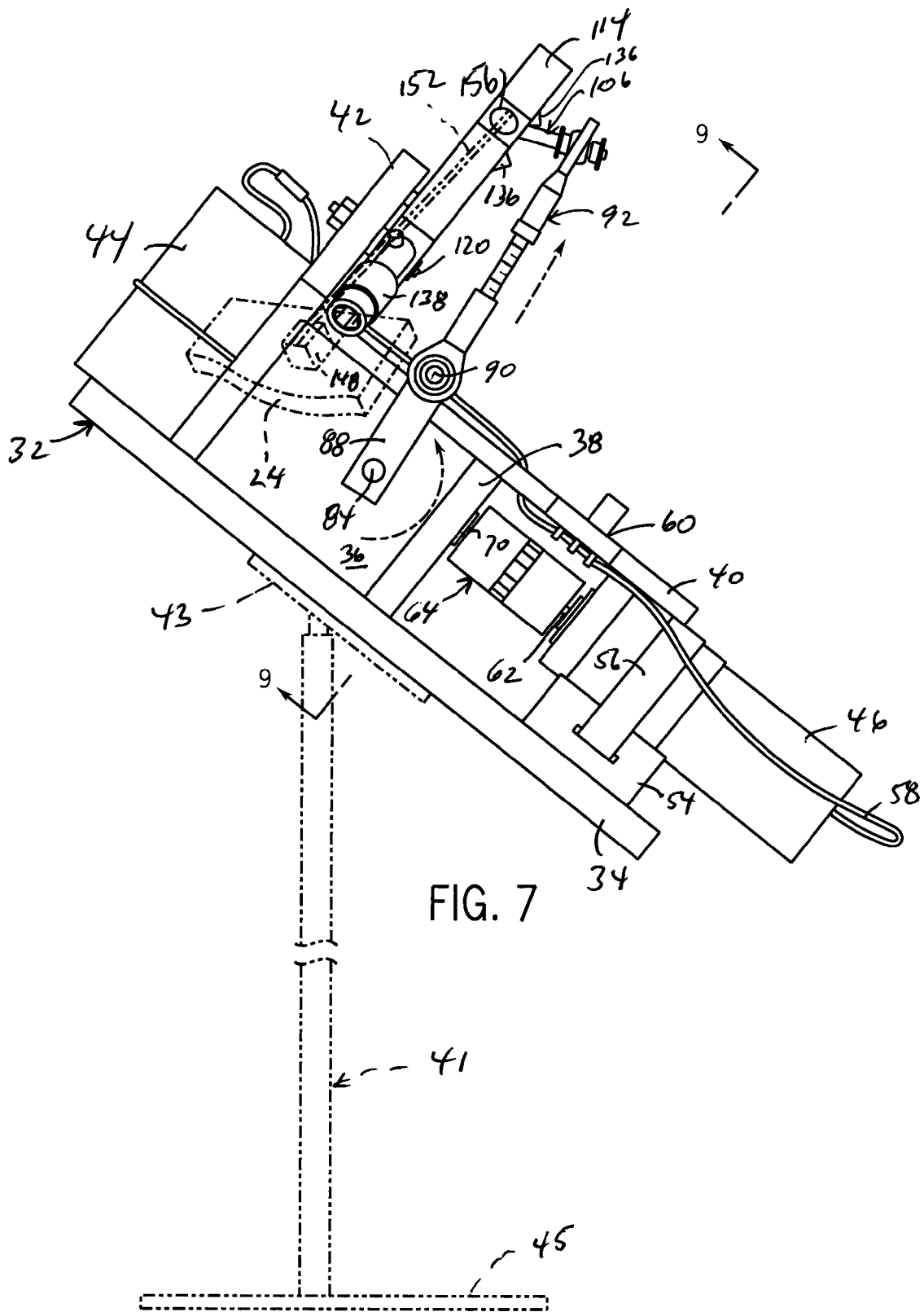
FIG. 7 is a side elevational view thereof, as shown with an optional mounting post.
Figure 8:
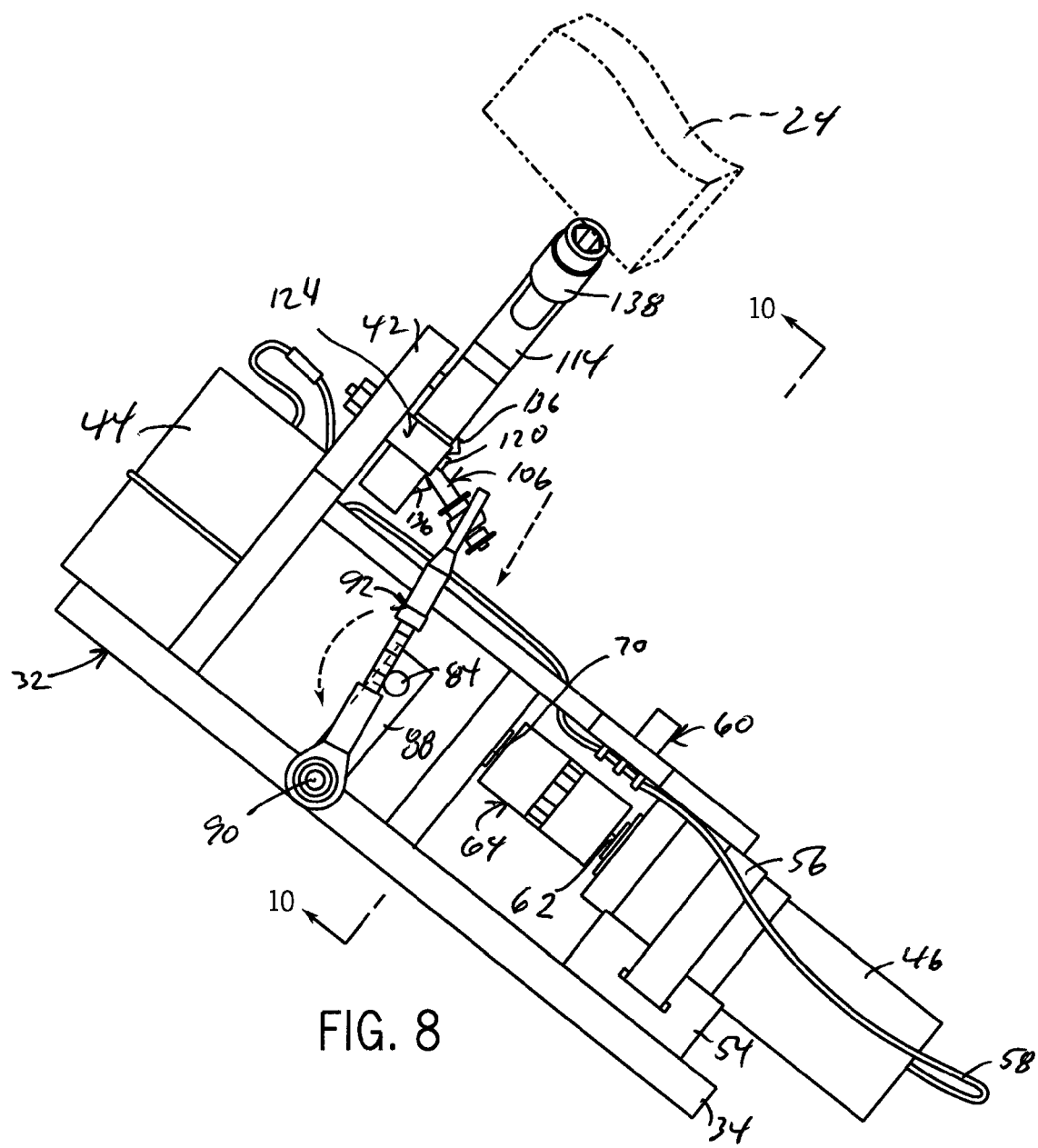
FIG. 8 is another side elevational view thereof in a different position of the wing beat motion.
Figure 9:
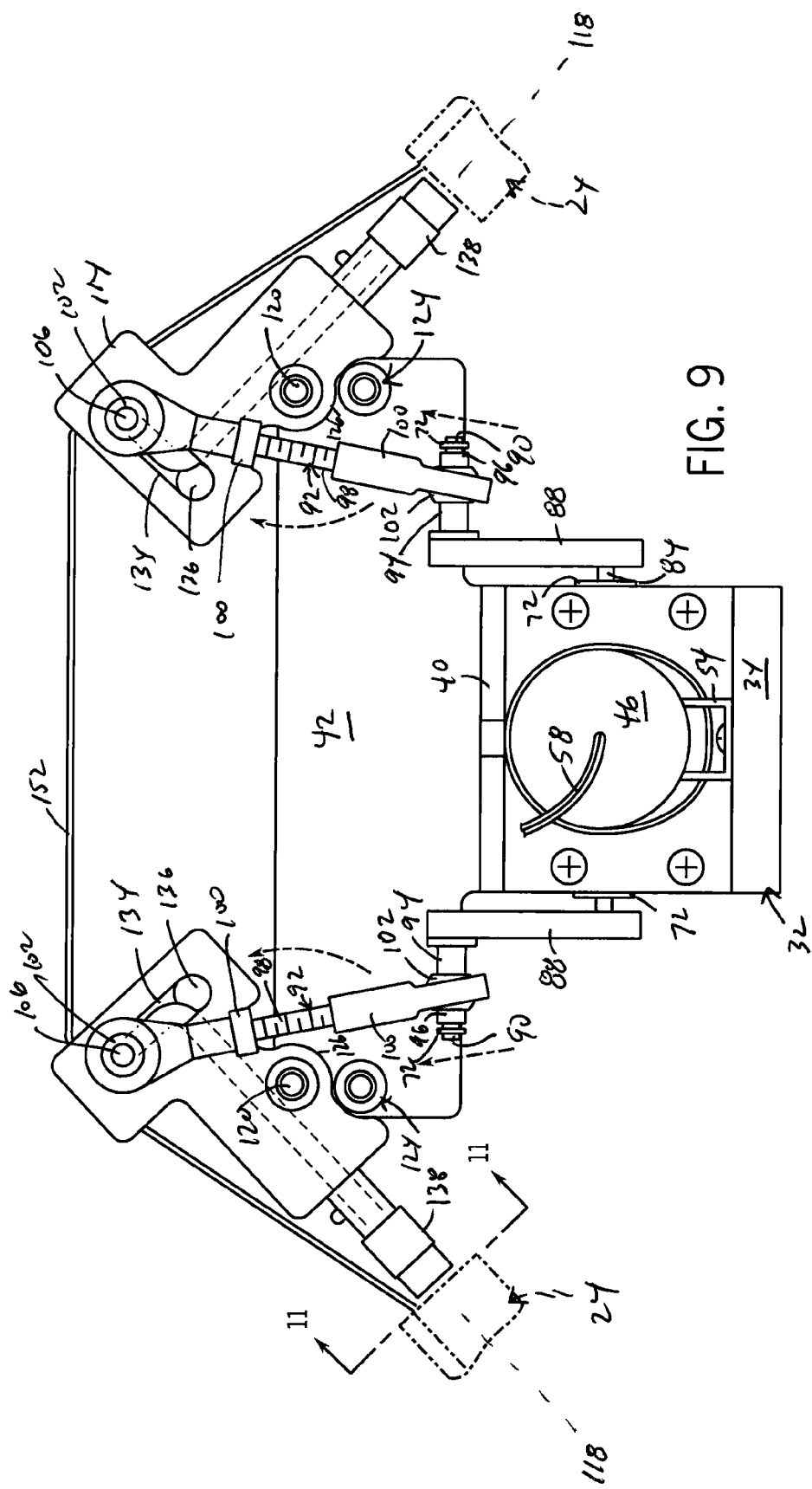
FIG. 9 is a rear view from the perspective of line 9-9 in FIG. 7 showing the drive and link assemblies in the FIG. 7 position.
Figure 10:
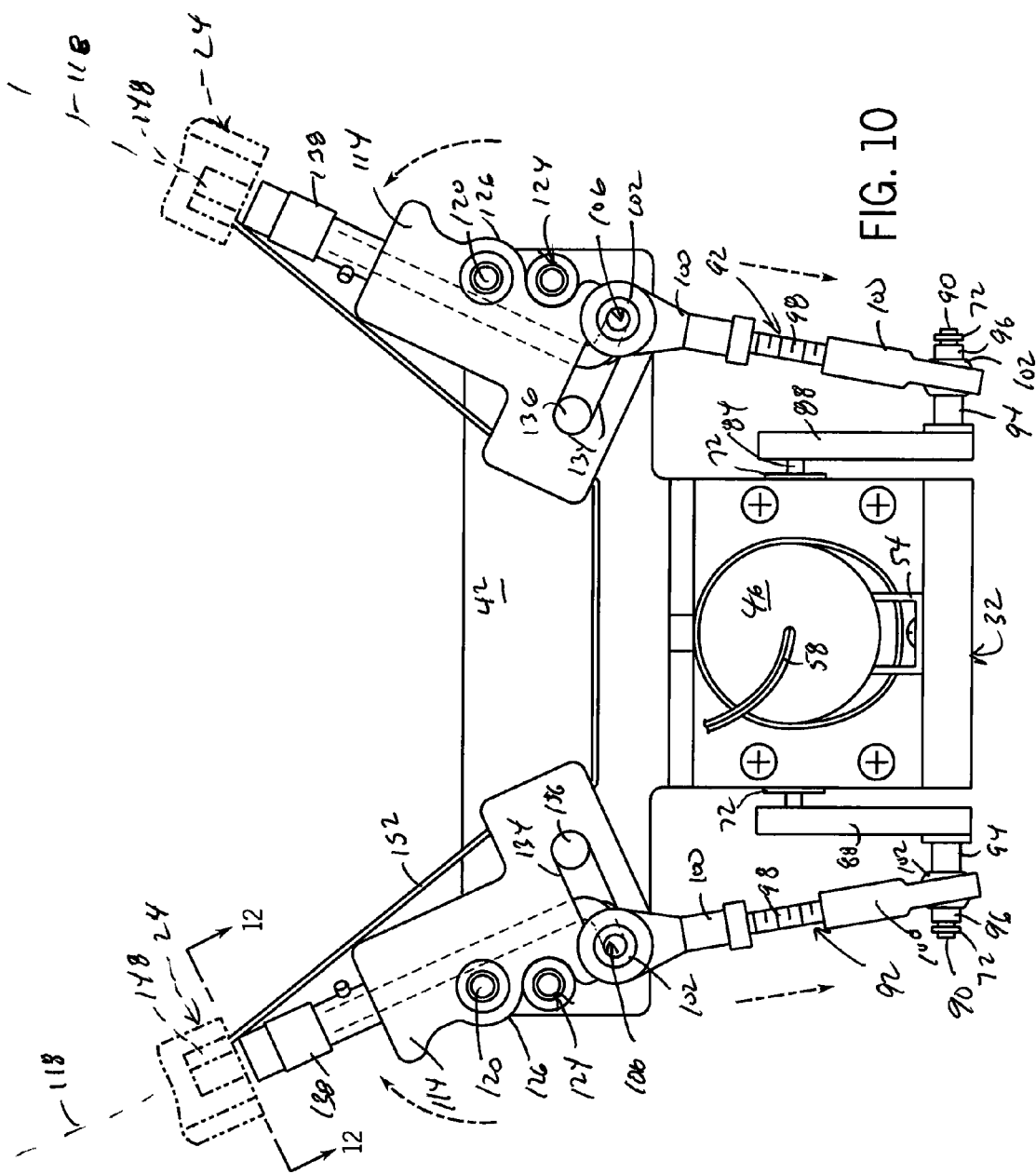
FIG. 10 is a rear view from the perspective of line 10-10 in FIG. 8 showing the drive and link assemblies in the FIG. 8 position.
Figure 11:
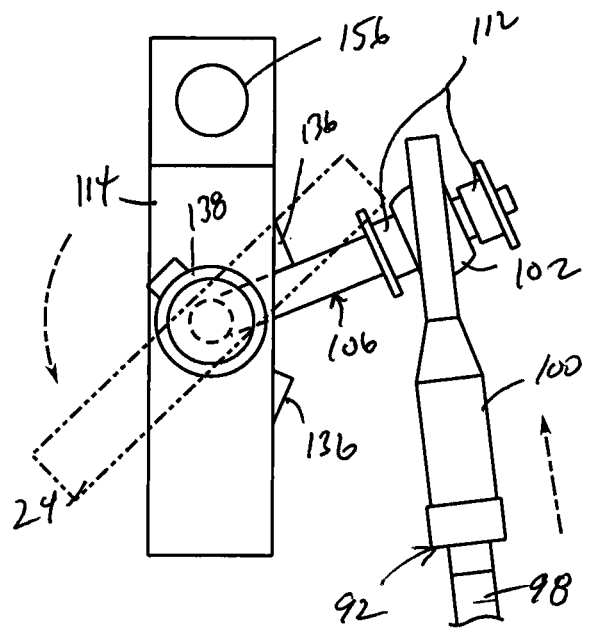
FIG. 11 is a partial side view from the perspective of line 11-11 in FIG. 9 showing the linkage assembly in the FIG. 7 position.
Figure 12:
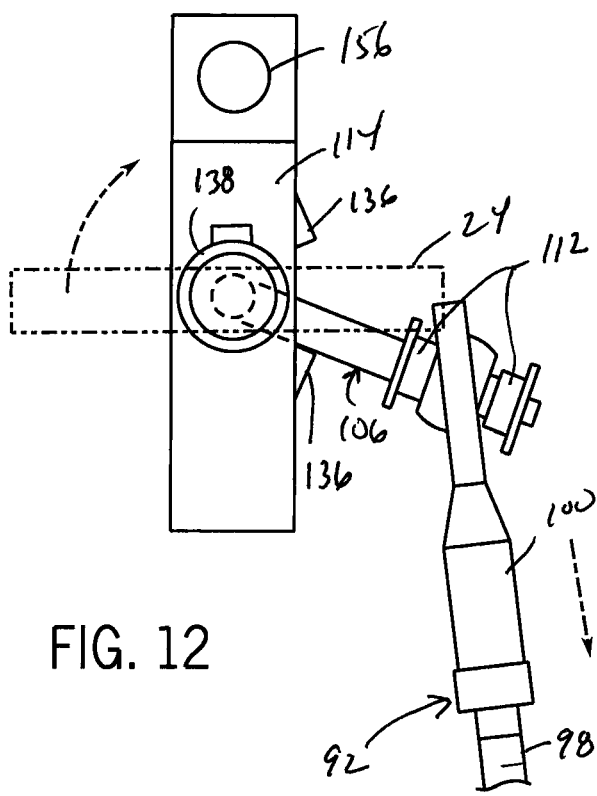
FIG. 12 is a partial side view from the perspective of line 12-12 in FIG. 10 showing the linkage assembly in the FIG. 8 position.

Furthermore, as shown in FIG. 7, the mounting base 32 can be supported in the field by a mounting post 41. The mounting post 41 can be connected directly to the mounting base 32, for example, by bolting a mounting bracket 43 to the platform 34, or it can be coupled to it indirectly through the decoy body 22. The mounting post 41 can have an elongated member with a solid or hollow core and made of metal, plastic or other rigid material. The elongated member can be staked into the ground or if the motion decoy 20 is to be used on a hard surface, it can be supported by a flat base 45.

With reference to FIGS. 4-12, the actuating components of the motion decoy 20 will now be described in detail. The major components include: a battery pack (or electric power source) 44, a motor 46, a drive gear arrangement 48, linkage assemblies 50 and swivel joints 52.

The DC motor 46 can be selected to meet the cycle and load requirements as required. However, as one example, the motor 46 can be a 12 VDC planetary gear motor operating at 110 RPM. The battery pack 44 can be sized to meet the power requirements of the motor 46, which in the example given is 12 VDC, and can be any conventional chargeable or non-rechargeable battery format, such as alkaline, nickel metal hydride, nickel cadmium and lithium batteries. The battery pack 44 can include an adapter cord (not shown) for charging the battery cells or for running the motor 46 from an external power source. In any event, both the battery pack 44 and the motor 46 can be supported by the mounting base 32. For example, the battery pack 44 can rest on the front of the platform 34 either freely or fixedly, and the motor 46 can be attached to the back of the platform 34 by a generally U-shaped motor mount 54 which cradles the cylindrical body of the motor 46 and is secured by a spring clamp 56. The motor mount 54 can be secured to the platform 34 via any suitable connection. The battery pack 44 can connect to the motor 46 by a power lead 58. A conventional two position slider or push button on/off switch 60 can be inserted in-line between the battery pack 44 and the motor 46 to provide manual control of the motion decoy 20. A fuse (not shown) can also be included to short circuit in the event of a power surge or other abnormal spike in the electrical system.

The motor 46 has a rotating motor shaft 62 that couples with the drive gear arrangement 48 to effect wing motion via the linkage assemblies 50 and the swivel joints 52. The rotating shaft 62 can be a ¼" cylindrical keyed shaft of sufficient length to mount a flexible shaft coupler 64. The shaft coupler 64 can be a standard jaw coupling, such as commercially available from Lovejoy, Inc. of Downers Grove, Ill. The shaft coupler 64 can have two aluminum split collars 66 with axial legs that are mounted in opposing relation so as to capture the radial arms of a flexible member 68, which can be made of a suitable elastomer. The inner one of the split collars 66 can clamp onto the motor shaft 62 by a set screw (not shown) that threads into tangential openings in the collar. In the same manner, the outer split collar 66 can clamp onto a gear shaft 70. A snap ring 72 can be fit into an annular groove in the gear shaft 70 to assist in retaining the split collar 66 on the gear shaft 70.

The motor mount 54 can position the motor 46 on the mounting base 32 such that the motor 46 is aligned with the platform 34 and the gear shaft 70 fits into an opening 74 in the end wall 38. The opening 74 can have a bushing or bearing 76 shown), such as a sealed ball bearing, to journal the gear shaft 70 with respect to the end wall 38 and allow for smooth, low friction rotation of gear shaft 70. A washer 80 can be mounted to the gear shaft 70 between the shaft coupler 64 and the end wall 38 to further facilitate rotation of the gear shaft 70. A drive gear 78 can then be mounted to the free end of the gear shaft 70 by press fit, set screw or retainer spring (not shown) press fit into aligned radial openings in the gear shaft 70 and drive gear 78. With the motor 46 secured in the motor mount 54 and the drive gear 78 on the gear shaft 70 and the gear shaft 70 journaled to the end wall 38, relative axial displacement of the motor 62 and gear 70 shafts, and the components of the shaft coupler 64, is prevented.

The drive gear 78 can be a bevel gear or miter gear made of a suitable material and with a suitable number and profile of teeth. For example, the drive gear 78 can be a straight tooth miter gear made of nylon having 24 teeth and a 20 degree pressure angle. The drive gear 78 is sized to mate with a crank gear 82 which is mounted to a crank shaft 84. The crank gear 82 can be mounted off center on the crank shaft 84 by press fit, retainer spring or a set screw (not shown), which threads into an opening in the crank gear 82 to press against a flat section of the crank shaft 84. The crank gear 82 can be any suitable material and have any suitable number and profile of teeth. For example, the crank gear 82 can be a metal bevel or miter gear with 16 straight teeth sized and profiled to mate with the teeth of the drive gear 78. The drive 78 and crank 82 gears can thus provide a right angle power transfer with a gear teeth ratio of 24/18, or a 4:3 gear ratio. The crank gear 82 is positioned by journaling the ends of the crank shaft 84 to the side walls 36 of the mounting base 32. Like the gear shaft 70, the ends of the crank shaft 84 are journaled using bearings 76. Snap rings 72 can be mounted at grooves in the crank shaft 84 to prevent relative axial movement of the crank shaft 84.

Crank arms 88 can mount onto each end of the crank shaft 84 to the outside of the side walls 36. The crank arms 88 can be mounted by press fit, retainer spring or by set screws (not shown) threaded into end openings in the crank arms 88 which tighten against flat areas of the cranks shafts 84. The crank arms 88 can be made of a rectangular aluminum bar stock of approximately 1¾ inch in length. The free ends of the crank arms 88 have openings that can mount pins 90, such as 1 inch long 3/16 inch diameter pins, for example in a press fit, which extend out perpendicularly, that is parallel to the crank shaft 84, to mount coupler links 92. Nylon spacer collars 94 and 96 can be mounted on the crank arm pins 90 on each side of the coupler links 92, and snap rings 72 can be fit into annular grooves in the pins 90 to retain the coupler links 92.

The coupler links 92 can be any suitable members capable of transmitting the rotational input of the crank arms 88 into pivotal movement of the wings 24, and more specifically to connect the crank arms 88 that each rotate in a single fixed plane about a single crank axis to other linkages that each simultaneous pivot in multiple planes about multiple axes. In other works, the coupler links 92 couple parts with rotational motion to parts with compound or biaxial oscillatory motion.

The example construction of the motion decoy 20 illustrated in the drawings has the coupler links 92 each being made of an externally threaded rod 98 and two spherical rod ends 100, of the type commercially available from Igus, Inc. of East Providence, R.I., which have threaded openings that thread onto the threaded rod 98. Of course, the rod could be an internally threaded tube and the rod ends could have male threaded ends that thread into the openings of the tube. In either case, the rod ends 100 have ball joints 102 that can swivel about their center axes in every direction a prescribed angle, such as 20-30 degrees. In addition, the threaded connection between the rods 98 and the ends 100 can be sufficiently loose to allow for relative rotation. Thus, the example coupler links 92 can connect to the oscillating linkages, which can thus rotate and swivel with respect to the crank shaft 84 and the revolving pins 90 to which the coupler links 92 are attached.

The ball joints 102 have openings 104 through them which connect the oscillating linkages. In the illustrated example, the oscillating linkages are angle members 106 which generally have an L-shape with a short leg 108 and a long leg 110. The short leg 108 of each angle member 106 can extend through the ball joint opening 104 in the associated coupler link end 100. Plastic spacer collars 112 and snap rings 72 can be mounted on the short leg 108 on each side of the associated ball joint 102.

The angle members 106 couple to swivel bodies 114 in a manner that causes them to pivot back and forth about a pair of stationary swivel axes 116 that extend generally in the front to back direction of the motion decoy 20. These axes 116 can also be generally parallel to the motor 62 and gear 70 shafts and perpendicular to the crank shaft 84. At the same time, the angle members 106 are caused to pivot back and forth along traveling axes 118 that extend in the long dimension of the wings 24. Thus, as the angle members 106, and thereby the wings 24, pivot about the stationary axes 116, they also pivot about the traveling axes 118.

More specifically, in the illustrated example, the swivel bodies 114 are constructed the same except for being mirror images, and as such only one will be described now. Each swivel body 114 can have a generally L-shape body made of a suitably rigid material, such as a high density plastic. Each swivel body 114 has an opening receiving a swivel pin 120 mounted to the upright wall 42 of the mounting base 32 along the stationary axis 116. A nylon spacer collar 94 and washer 122 can be mounted on the swivel pin 120 at opposite sides of the swivel body 114 to facilitate pivoting. The pivot angle about the stationary axis 116 corresponds to the flap angle through which the wings 24 travel during a wing beat. In the illustrated example, the pivot angle is approximately 130 degrees, which is corresponds to a wing flap angle of a live waterfowl during the "lighting" or landing phase of flight. Replicating this landing wing motion presents an innately familiar image of safety to waterfowl and is thus a highly desirable flap angle for the motion decoy 20 to replicate. However, it should be noted that the pivot angle about the stationary axes 116, and thereby the wing flap angle, can be varied, including obtuse and acute angles in the range of approximately 70-160 degrees.

Travel limiters 124 can be mounted to the upright wall 42 of the mounting base 32 to project there from above or below the swivel bodies 114. In the illustrated example, the travel limiters 124 simply consist of bolt mounted rubber sleeves mounted to the upright wall 42 below the swivel pin 120. Each swivel body 114 can have an undulating cam surface 126 along a lower edge which rides along the travel limiter 124 while in motion. Each cam surface 126 can have a convex center portion between two concave portions. Thus, when the swivel body 114 pivots to the desired pivot angle in either direction, the travel limiter 124 will engage the concave portions and thus interfere with further pivoting. This travel limiting arrangement can be configured to set the pivot angle during every wing beat, or instead it can be configured as a backup in the event the normal range of motion has been exceeded due to usual operating conditions or for other reasons.

Each swivel body 114 can be formed with a through bore 128 that extends through its length and receives the long leg 110 of the associated angle member 106 to allow it to pivot along the traveling axis 118. The bore 128 can have a stepped inner diameter, and a stop collar 130 can be press fit onto the long leg 110 of the angle member 106 to limit axial movement of the angle member 106. The long leg 110 can extend along the traveling axis 118 through openings 132 in the end faces of the swivel body 114. The short leg 108 can extend through an opening 134 at a side face of the swivel body 114. The side face opening 134 can be elongated to allow the angle member 106 to pivot about the traveling axis 118 through a sufficient pivot angle. This angle corresponds to the angle that the wings 24 rotate through during a wing beat. Thus, it is desirable for this angle to be at least 90 degrees to replicate the natural flapping motion of a waterfowl. However, this angle can vary, and generally can be in the range of approximately 60-130 degrees to provide the desired effect. Compliant inserts 136, such as rubber grommets, can be attached to the swivel bodies 114 that act as stop members to both define the pivot angle about the traveling axis 118 and to also provide cushioning and noise dampening between the swivel bodies 114 and the angle members 106.

As mentioned, in the illustrated embodiment the free ends of the long legs 110 of the angle members 106 project out through end openings 132 in the swivel bodies 114 to couple to the wings 24. A coupler 138 can be mounted to each projecting end of the angle members 106 to facilitate the wing connection. Any suitable type of permanent connection can be used. However, removably coupling the wings 24 can aid in portability of the motion decoy 20 and also facilitate replacement of the wings 24 in the event of wing damage or to provide a different type or size of wing designed to replicate a different species, type or breed of waterfowl. The illustrated example has a coupler 138 with a conventional female spring disconnect coupling. The coupler 138 can have a multi-sided opening, such as a hex socket 138, at one end and another end having a bore that receives the projecting end of the angle member 106. The coupler 138 can be connected by a press fit or spring retainer, or by a set screw that tightens against a flat section at the projecting end of the angle member 106.

Referring now to FIGS. 3, 13-14 and 18A-B, the wings 24 will now be described in detail. As mentioned, the left and right wings 24 are the same except that they mounted as mirror images of each other so that they are symmetrical relative to the decoy body 22. The wings 24 can be cut from of a light weight material to have the size and feather pattern desired such as to replicate a particular species, type or breed of waterfowl. For example, as illustrated, the wings 24 can be constructed from corrugated sheets of plastic, such as polypropylene, having a hollow, corrugated core with smooth, flat top and bottom sides. Each wing 24 can be cut from the corrugated sheets in a single piece, or each wing 24 can be constructed of two or more wing sections, such as proximal wing panel 140 and distal wing panel 142. When there are multiple wing sections, the individual sections can be coupled together using any suitable connector to hold the sections in fixed or movable relative positions.

The distal wing panel 142 can be connected to the proximal wing 140 so that it can flex or pivot with respect to the proximal wing panel 140, and thus "flap" somewhat independently during the wing beat motion. Thus, the additional joint or joints connecting the multiple panels of the wings 24 can provide one or more additional pivot axes for the wings 24 during the wing beat motion. For example, in the illustrated example the angled joint in each wing 24 extends generally along a second traveling axis 122 which moves with the wing 24 about the stationary 116 and traveling 118 axes. Pivoting of the distal wing panels 142 about the traveling wing axes 122 gives the wings 24 a third degree of freedom during the wing beat motion. This type of compound wing flapping motion could be accomplished in other ways, such as by a hinge or other joint, or by using different materials with different rigidity values. It is even possible to provide such motion in a single-piece wing by providing a thinned region or "living hinge" within the wing.

Figures 13, 14:
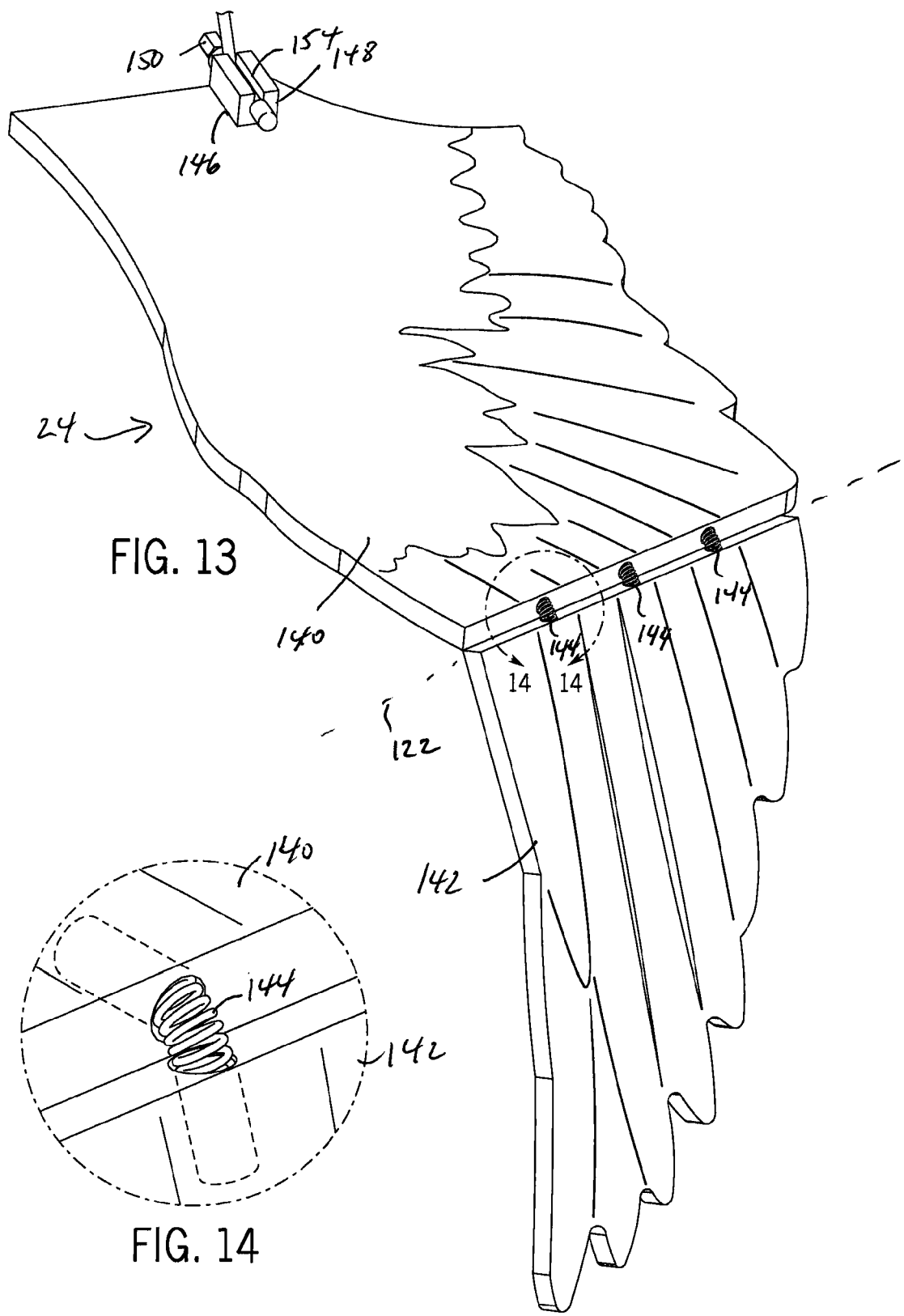
FIG. 13 is a front perspective view of the left wing of the example decoy showing the wing tip in a downwardly flexed position.
FIG. 14 is an enlarged view taken along arc 14-14 in FIG. 13 showing a spring connection of the wing tip.

In the illustrated example, the distal wing panel 142 is flexibly connected to the proximal wing panel 140 by one or more springs, such as the three extension springs 144 shown in FIGS. 13 and 14. Each of the three springs 144 can be about 1 inch long with a ¼ inch outer diameter and have a spring rate of approximately 3 pounds at 1 inch of pull to give the distal wing panel 142 a desirable amount of flex. However, the degree of flex can be varied by changing the number, size and spring rate of the springs. Moreover, the amount of deflection that the distal wing panel 142 undergoes during the wing beat motion can be changed by changing the relative size of the wing panels 140, 142, and thereby the location where the wing panels 140, 142 are joined together. In any case, the springs 144 can be connected to the wing panels 140, 142 in any suitable manner, including mechanical fasteners and adhesives. In the illustrated example, the springs 144 connect in a press fit by being sized so that that they fit tightly within the hollow cores between interior corrugations.

Moreover, the stretch cord 152 can be given a wear-resistant or friction-reducing treatment to allow for smooth movement through the swivel bodies 114 and reduce premature wearing of the stretch cord 152. For example, a silicone or like material can be applied to the stretch cord 152. More specifically, a silicone gel can be applied to the stretch cord 152 when in a pre-stretched condition. Empirical study indicates that treating the stretch cord 152 in this manner can extend the useful life of the stretch cord 152 considerably, such as by 20-40 times the life of an untreated stretch cord.

The wings 24 can be simple, undefined elongated shapes and have plain solid color top and bottom sides, which could be the same or similar color on each side or could be of contrasting colors, such as a white or other light color on the bottom side and a black or other dark color on the top side. However, the motion decoy 20 can better resemble a live waterfowl by making the wings 24 of a more realistic size, shape and surface ornamentation. For example, the top and bottom sides of the wing panels 140, 142 can be given a visual appearance that replicates the feather grouping of natural waterfowl using any suitable technique, such as by applying decals or printing, such as realistic photo-printing processes. By way of example, the ornamentation of the top and bottom sides of the wing panels 140, 142 can depict lesser, middle, greater and primary coverts at the fore of the wing as well as the "primaries" and "secondaries" at the aft of the wing. The wing panels 140, 142 can have printing that shows the top of these feather groups at the top side and the bottom of these feather groups at the bottom side. Moreover, the contrast and coloring can be generally darker at the top side and lighter at the bottom side to better mimics natural waterfowl.

The illustrated example shows the two wing panels 140, 142 having contoured perimeter edges that replicate the shape and feather grouping of a waterfowl. The leading edges of the wing panels 140, 142 can be have smooth contours that combine to form a complex undulating surface. The leading edge of the proximal wing panel 140 has an inner concave portion leading to a convex portion. The leading edge of the distal wing panel 142 begins by generally continuing to follow the convex contour of the proximal wing panel 140 and then changes inflection and begins to extend forward to the distal tip. The front edges of the wing panels 140, 142 thus mimic the natural wing sweep of natural waterfowl. The trailing edge of the wing panels 140, 142 can follow a generally widening convex path from the distal tip to the proximal end and can be generally serrated or feathered in a manner that replicates the tips of the primary and secondary feather groupings of a natural waterfowl wing. By changing the feathered edge profile as we as well as overall size and wing sweep of the wings 24, any particular species, type or breed of waterfowl can be replicated. In the illustrated example, each wing 24 can be approximately 5 inches between the leading and trailing edges at the widest part of the wing 24, and approximately 15 inches from the proximal end to the distal tip, thus giving the motion decoy 20 a wingspan of approximately 40 inches.

The inner edge of the proximal wing panel 140 can have a scooped portion to accommodate the decoy body 22 and a straight section that has a rectangular notch 146. The notch 146 can accommodate a wing mount 148. The wing mount 148 can be a block of lightweight, rigid material, such as a lightweight hard plastic, for example Lexan®. The wing mount 148 has an opening for coupling a wing shaft 150, which can be a rigid rod of suitable length and thickness. In the illustrated example, the wing shaft 150 is a hex shaft approximately 4 inches long and a ¼ inch wide such that it can be press fit tightly into a hollow core between the corrugations of the proximal wing panel 140. However, other suitable mechanical fasteners or adhesive could be used. The free end of the wing shaft 150 projects out of the proximal wing panel 140 through the notch 146. The wing mount 148 can be press fit onto the wing shaft 150 spaced down from the free end. The projecting free end of the wing shaft 150 can thus be received in the opening of the disconnect coupler 138 to connect the wing 24 to the swivel joint 52. The flat sides of the hexagonal wing shaft 150, the press fit to the proximal wing panel 140 and the mating flat sides of the coupler 138 allow the wings 24 to mounted in a particular orientation. Moreover, the printing and configuration of the wings 24 as well as the offset seating of the wing mount 148 in the notch 146 helps to ensure that the wings are mounted in the proper orientation.

To ensure that the wings 24 are held in the proper orientation, as well as to help stabilize and unite the wing beat motion of both wings, a counter balance can be incorporated into the motion decoy 20. In the illustrated example, the counterbalancing force can be provided by an tensioning member, such as a stretch cord 152. The stretch cord 152 can be coupled to the wing mount 148 of each wing 24 in a through opening, such as open-ended groove 154. The open-ended groove 154 allows the stretch cord 152 to be attached and detached quickly from the wing mount 148. Looped, knotted or other enlarged ends prevent the elastic cord from slipping through the grooves 154 during wing motion.

In the example construction, the elastic cord can be about 11 inches long and has a 120% stretch giving an effective spring rate of approximately 2.5 pounds at 4 inches of pull. The stretch cord 152 can also be fed through openings 156 that pass through the swivel bodies 114 in a direction generally parallel to the wing shafts 150 and traveling axes 118. The stretch cord 152 can be fixed to the swivel bodies 114, or as in the illustrated example, it can be free to slide in and out of the openings 156 as it is tensioned and released during wing motion. With the elastic cord 152 attached to both wing mounts 148 and swivel bodies 114, it not only ties the left and right wings 24 together, but the applied force tends to tilt the wings 24 such that the leading edges of the wings 24 are lower than the trailing edges, which give the wings an angle of attack that better resembles a natural waterfowl.

Figure 15D:
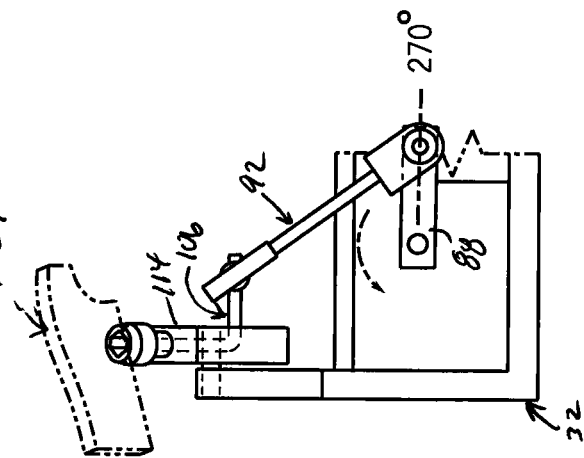
FIGS. 15A-15D are a series of simplified partial side views illustrating the left wing and linkage assembly at respective 0°, 90°, 180° and 270° positions of the drive crank during the wing beat motion.
Figure 15C:
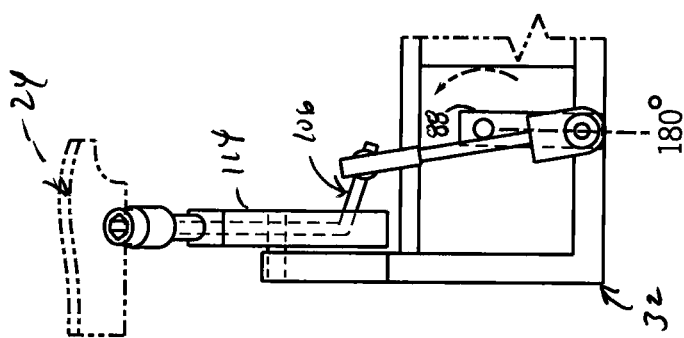
Figure 15B:
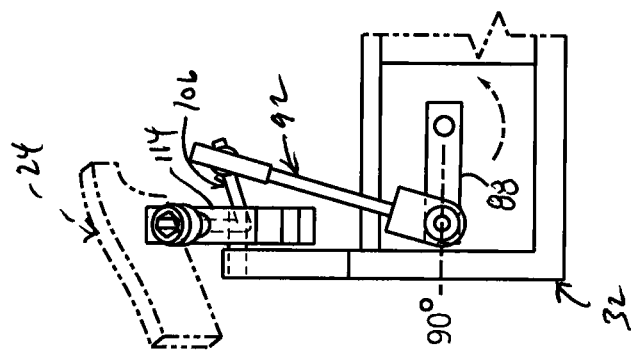
Figure 15A:
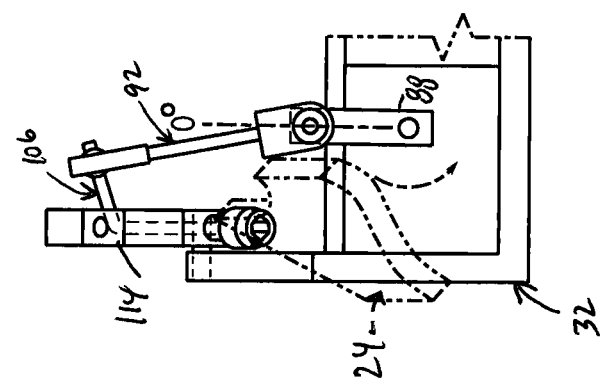

Having detailed the components that make up the illustrated example shown in the drawings, the operation of the example motion decoy 20 will now be described with reference to the sequence of four angular positions shown in FIGS. 15A-15D and the corresponding views of FIGS. 16 and 17. Specifically, FIG. 15A illustrates the moving components of the motion decoy 20 when the crank arms 88 are at a 0 degree, or 12 o'clock, position of revolution about the axis of rotation of the crankshaft 84. FIGS. 15B-15D show these components when in the 90 degree (9 o'clock in FIG. 15B), 180 degree (6 o'clock) and 270 degree (3 o'clock in FIG. 15D) angular positions, respectively. These sequential figures, in combination with the corresponding views of FIGS. 16 and 17 illustrate how the working components work to simultaneously pivot and rotate the wings 24 about two different axes, namely the stationary axes 116 and the traveling axes 118.

As shown in FIG. 15A, the motor can position the crank arms 88 into the 12 o'clock position, which drives the coupler links 92 to rotate into their highest position. When the coupler links 92 are in this position, the swivel bodies 114 are pivoted about the stationary axes 116 at or near the greatest angle in one direction (see FIG. 16A). Note that the swivel bodies 114 pivot in opposite clockwise and counterclockwise directions. In this position, the angle members 106 are rotated about the traveling axes 118 at or near the greatest angle in one direction (see FIG. 17A). This tips the front edge of the wings 24 down and puts the wings 24 at or near the bottom of the down stroke of the wing beat. In this position, the stretch cord 152 is at or near its highest tension during the wing beat. The motor 46 drives the crank arms 88 to revolve to the 90 degree position of FIG. 15B, the coupler links 92 are driven downward, which in turn rotate the angle members 106 and the swivel bodies 114 to pivot substantially simultaneously about the stationary 116 and traveling axes 118, respectively, into the intermediate position shown in FIGS. 16B and 17B. As the motor 46 continues to drive the crank arms 88 to the 180 degree position shown in FIG. 15C, the coupler links 92 are at their lowest position, which in turn substantially simultaneously drives the swivel bodies 114 and the angle members 106 to pivot about the stationary 116 and traveling axes 116, respectively, to be at or near their greatest angle in the opposite direction from the FIG. 15A-17A position (see FIGS. 16C and 17C). This position corresponds to at or near the highest part of the upstroke of the wing beat. As the motor 46 continues to drive the crank arms 88 to complete a revolution, the coupler links 92 cause the swivel bodies 114 and angle members 106 to pivot about the stationary 114 and traveling 116 axes, respectively, into the intermediate position shown in FIGS. 16D and 17D.

Moreover, in the illustrated example, the wings 24 of the motion decoy 20 can pivot about the stationary axes 116 over 90 degrees, for example approximately 130 degrees, and rotate about the traveling axes 118 approximately 90 degrees. The obtuse flap angle and 90 degree rotation, essentially 45 degrees above and below center, replicates the lighting phase of a natural waterfowl. Also, the example motion decoy 20 provides a wing beat of approximately 2½ beats per second, which is also reflective of a lighting waterfowl.

In addition, the multi-part wing construction described above also impacts the wing beat motion. Specifically, as shown in FIGS. 18A-18B, the distal wing panel 142 will pivot along the joint as the springs 144 are caused to flex under the forces imparted on the top and bottom sides of the distal wing panel 142 during the wing beat motion. More specifically, as the wings 24 reach the top of the upstroke, inertial force will tend to continue the distal wing panels 142 moving upward even as the proximal wing panels 140 stop and begin to be driven downward. The springs 144 will flex first to allow the distal wing panels 142 to angle upward, and then will drive them downward with the proximal wing panels 140. As FIG. 18B shows, a similar phenomenon will occur as the wings change from the down stroke to the upstroke. In doing so, the distal wing panels 142 must "catch-up" to the proximal wing panels 140 during which time the distal wing panels move at a faster rate than the proximal wing panels 140. The multi-part wing construction shown in the illustrated example thus provides an even more realistic representation of the wing beat of a natural waterfowl.

Furthermore, as mentioned, the stretch cord 152 works to help maintain synchronization of the left and right wings 24, but also applies a counterbalancing force on each wing 24, swivel joint 52 and linkage assembly 50 as the wings 24 move through the down stroke. The counterbalancing helps to overcome inertial and gravitational forces that arise during the wing beat motion and stabilize the rotational position of the wings 24 during motion. And when at rest, the stretch cord 152 tends to return the movable parts to the home position. For example, the drive gear arrangement 48, linkage assemblies 50, swivel joints 52 and wings 24 can start and return to a home position generally corresponding to a crank angle of 90-110 degrees. Still further, the stretch cord 152 helps to bias the angle of attack of the wings 24, such as to have a slightly declined angle, for example 5-20 degrees, in which the front edges are titled lower than the back edges.

Should momentum or other inertial or exogenous forces drive the wings 24 beyond the normal top and bottom of the respective upstroke and down stroke, the swivel bodies 114 can pivot such that the concave portions of the cam surfaces 126 can engage the travel limiters 124. In this way, the travel limiters 126 provide positive end of travel stops at both ends of pivoting about the stationary axes 116, and thereby positively constrain the flap angle of the wings 24.

The foregoing is a description of the example motion decoy construction illustrated in the drawings. However, alternative constructions and augmentations may be provided. For example, to aid in reducing noise generated by the motor or the linkage assemblies, the decoy body could be provided with a thicker wall construction, a tighter fitting top cover and/or noise baffles or insulation in the interior of the body. Also, the mounting base 32 could be modified in configuration or materials, or it could be eliminated such that the linkage assemblies connect directly to the decoy body 22 or to an external mounting. A modular gearbox and motor components could be used. Moreover, for locations where mechanized decoys are prohibited, a disengagement mechanism, such as a pull cord coupled to a clutch or displaceable gear could be used to disengage the motor and disable powered movement of the wings.

Further, the electrical circuit of the motion decoy could include known circuitry to provide a delay or intermittent wing motion. Such circuitry could also be used to cycle or control the motor, which could be a servomotor, to move the wings through partial wing flap angles or through a prescribed number or rate of wing beats. Such circuitry could also be used to return the wings to a home position after wing motion. Still further, the power circuit could include a remote control sensor using any known remote control technology, such as infrared and Bluetooth. With remote control capabilities, the motion decoy could be operated remotely by a dedicated control unit or any other mobile device, such as mobile phone or tablet computer.

Additionally, as noted throughout, the motion decoy illustrated in the drawings replicates a duck. However, the principles and mechanisms disclosed herein can be utilized for waterfowl decoys of other species, types and breeds. For some, the desired waterfowl can be replicated by simply interchanging or modifying the decoy body, the wings or both. In cases were the wings would be of a size and weight significantly larger or smaller than that described herein, modifications to the power, motor, gearing and linkage mechanisms may be necessary to provide the proper wing beat motion under the increased or decreased loading of the different wings.

As one example, the motion decoy could be modified to replicate a standard goose. In this case, in addition to providing different feathering ornamentation and edge configuration of the wings, the wings could be larger, such as approximately 21 inches long, thus giving the motion decoy approximately a 52 inch wingspan. The motor could be sized larger and operate at approximately 200 RPM and the gear ratio could be inverted from that of the foregoing duck example to a 3:4 ratio by interchanging the drive and crank gears. This would work to increase output torque and decrease speed, thus moving the larger wings at approximately 140-170 wing beats per minute. Further, a second stretch cord could be incorporated in addition to the counterbalance force applied by the top side stretch cord. For example, the wing mounts could be modified or augmented to added connection points at the bottom side of the wings. The second stretch cord could act as shock absorber to dampen the forces acting on the moving components, such as when the wings change flap direction.

Accordingly, the foregoing detailed description describes the subject of this disclosure in one or more examples. A skilled person in the art to which the subject matter of this disclosure pertains will recognize many alternatives, modifications and variations to the described example(s). The scope of the invention is thus defined not by the detailed description, but rather by the following claims.

What is claimed is:

1. A waterfowl motion decoy, comprising:
a hollow body shaped in the form of a waterfowl;
at least one wing member shaped in the form of a waterfowl wing;
an actuator mounted within the body having a drive shaft rotatable about a drive axis;
a swivel joint pivotally coupled to the body so as to pivot about a pivot axis; and
a linkage assembly coupled to the drive shaft and the at least one wing member;
wherein rotation of the drive shaft about the drive axis simultaneously causes the linkage assembly to pivot the swivel joint about the pivot axis and rotate the at least one wing member about a rotation axis that pivots about the pivot axis along with the swivel joint;
wherein the linkage assembly includes a first part that extends along the rotation axis and rotates with the at least one wing member;
wherein the linkage assembly includes a second part that extends along an axis that intersects the rotation axis and pivots about the rotation axis along with rotation of the first part;
wherein the swivel joint includes a bore and an end opening disposed about the rotation axis through which the first part extends, and wherein the swivel joint includes a facial opening about an axis intersecting the rotation axis through which the second part extends.

2. The decoy of claim 1, further including stop members disposed within the facial opening between which the second part pivots.

3. The decoy of claim 1, wherein the first and second parts are legs of an angle member.

4. The decoy of claim 1, further including a travel limiter fixedly mounted with respect to the body and wherein the swivel joint includes a cam surface which rides along the travel limiter as the swivel joint pivots about the pivot axis.

5. The decoy of claim 1, wherein the linkage assembly includes:
a crank arm connected to the drive shaft and providing a pivot post at a free end thereof which revolves along the drive axis;
the first and second parts respectively comprise first and second legs of an angle member, the first leg extending along and rotatable about the rotation axis, the second leg extending at an angle to the rotation axis; and
a coupler having a first opening at a first end thereof that extends about the pivot post and a second opening at a second end thereof that extends about the second leg of the angle member, wherein the first and second openings of the coupler lie in planes at an angle to one another.

6. The decoy of claim 1, wherein the actuator includes a motor and gear arrangement that rotates the drive shaft about the drive axis.

7. The decoy of claim 1, further including:
the at least one wing member further comprising a second wing member in the form of a waterfowl wing;
a second swivel joint pivotally coupled to the body so as to pivot about a second pivot axis in parallel with the pivot axis; and
a second linkage assembly coupled to the drive shaft and the second wing member;
wherein rotation of the drive shaft about the drive axis simultaneously causes the second linkage assembly to pivot the second swivel joint about the second pivot axis and rotate the second wing member about a second rotation axis that pivots about the second pivot axis along with the second swivel joint.

8. The decoy of claim 7, wherein the wing members pivot and rotate substantially in unison.

9. The decoy of claim 8, further including a stretch cord coupled to the wing members to resist at least one of pivoting about the pivot axes and rotation about the rotation axes during at least a portion of a revolution of the drive shaft.

10. The decoy of claim 1, wherein the swivel joint and at least one wing member pivot about the pivot axis through a pivot angle of greater than 90 degrees.

11. The decoy of claim 10, wherein the pivot angle is about 130 degrees.

12. The decoy of claim 1, wherein the at least one wing member rotates about the rotation axis through a rotation angle of greater than 45 degrees.

13. The decoy of claim 12, wherein the rotation angle is about 90 degrees.

14. A waterfowl motion decoy, comprising:
- a hollow body shaped in the form of a waterfowl;
- a pair of wing members shaped in the form of waterfowl wings;
- an actuator mounted within the body having a drive shaft rotatable about a drive axis;
- a pair of swivel joints pivotally coupled to the body so as to pivot about parallel pivot axes; and
- a pair of linkage assemblies each coupled to the drive shaft and one of the wing members;
- wherein rotation of the drive shaft about the drive axis simultaneously causes the linkage assemblies to pivot the swivel joints about the corresponding pivot axis and rotate the wing members about rotation axes that pivot about the corresponding pivot axis along with the swivel joints;
- wherein a first linkage assembly in the pair of linkage assemblies includes a first part that extends along the corresponding rotation axis and rotates with the corresponding wing member;
- wherein the first linkage assembly includes a second part that extends along an axis that intersects the corresponding rotation axis and pivots about the corresponding rotation axis along with rotation of the first part;
- wherein a first swivel joint in the pair of swivel joints includes a bore and an end opening disposed about the corresponding rotation axis through which the first part extends, and wherein the swivel joint includes a facial opening about an axis intersecting the corresponding rotation axis through which the second part extends.

\* \* \* \* \*